O. C. FERRIS.
Locomotive Driving-Wheels.
No. 148,436. Patented March 10, 1874.
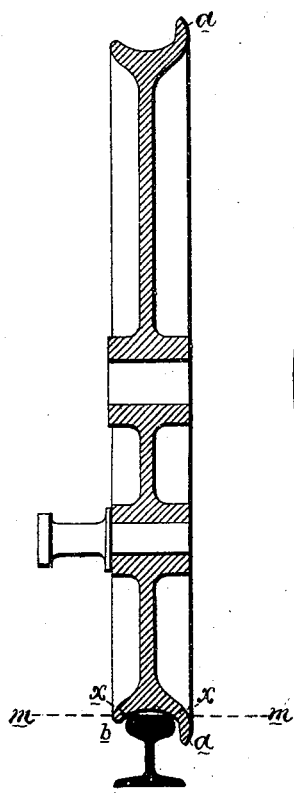
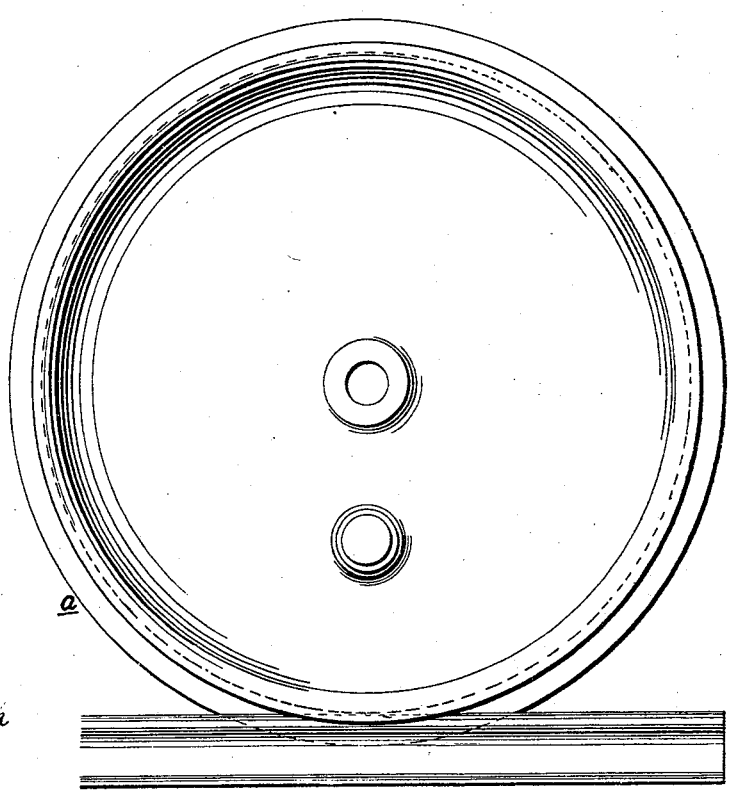
Witnesses,
Thomas McIlvain
John K. Rupertus
Oscar C. Ferris
By his Atty,
Howson and Son

UNITED STATES PATENT OFFICE.

OSCAR C. FERRIS, OF PHILADELPHIA, PENNSYLVANIA, ASSIGNOR TO HIMSELF AND FREDERICK B. MILES, OF SAME PLACE.

IMPROVEMENT IN LOCOMOTIVE DRIVING-WHEELS.

Specification forming part of Letters Patent No. 148,436, dated March 10, 1874; application filed August 4, 1873.

*To all whom it may concern:*

Be it known that I, OSCAR C. FERRIS, of Philadelphia, Pennsylvania, have invented an Improved Locomotive Driving-Wheel, of which the following is a specification:

The object of my invention is to prevent the slipping of locomotive driving-wheels on the rails, and this object I attain by making the flanged periphery of the wheel of the form illustrated in the vertical section, Figure 1, of the accompanying drawing, a side view of the wheel being shown in Fig. 2.

The treads of locomotive driving-wheels are always made straight, or are slightly rounded, so as to bear at one point only on the rails; hence, when the rails are wet, there is generally more or less slipping of the wheels. In order to obviate this, I provide the wheel with inner and outer flanges $a$ $b$ of different diameters, so that the tread of the wheel is concave, as shown in Fig. 1, or otherwise so recessed that it will bear on the rail at two points, $x$ $x$. The usual flange $a$ is retained, and the curve of the tread gradually merges into that of the inside of the flange, the concavity of the tread being such that when a line, $m$ $m$, parallel with the axle passes through both points of contact of the tread of the wheel with the rail, as shown in Fig. 1, the flange should be entirely free from the said rail, never to come in contact therewith excepting on rare occasions, when it may serve as a guard to prevent the wheel from leaving the track.

It is not necessary that the recess in the tread should be of the precise form shown; but the recess must be such that the tread of the wheel shall bear on the rail at the points shown, for while a greater depth of recess might insure a better adhesion of the wheel to the rail, it would create an objectionable friction, which would not accompany a tread formed to bear on the rails at the points $x$ $x$.

It should be understood that I propose to place but one wheel similar to that shown on each driving-axle, the other wheel being similar to those in present use.

I claim as my invention—

A driving-wheel having a groove merging into two flanges, $a$ and $b$, the inner one of which is of larger diameter than the outer, substantially as described.

In testimony whereof I have signed my name to this specification in the presence of two subscribing witnesses.

OSCAR C. FERRIS.

Witnesses:
   WM. A. STEEL,
   HUBERT HOWSON.